United States Patent [19]
Turnblad et al.

[11] Patent Number: 5,849,320
[45] Date of Patent: Dec. 15, 1998

[54] INSECTICIDAL SEED COATING

[75] Inventors: Kevin M. Turnblad, Sioux Falls, S. Dak.; Yugu Ang Chen, Lakeville, Minn.

[73] Assignee: Novartis Corporation, Summit, N.J.

[21] Appl. No.: 664,052

[22] Filed: Jun. 13, 1996

[51] Int. Cl.$^6$ .................................................. A01N 25/26
[52] U.S. Cl. ........................ 424/410; 424/417; 424/418; 424/419; 424/420; 504/100
[58] Field of Search ............................ 504/100; 424/410, 424/412, 420

[56] References Cited

U.S. PATENT DOCUMENTS

| | | | |
|---|---|---|---|
| 2,034,449 | 3/1936 | Sharp | 424/410 |
| 2,764,843 | 10/1956 | Peake . | |
| 3,264,181 | 8/1966 | Goodhue | 424/410 |
| 3,769,417 | 10/1973 | Van Breen | 424/419 |
| 4,383,391 | 5/1983 | Thomas et al. | 47/57.6 |
| 4,405,640 | 9/1983 | Punja | 424/305 |
| 4,440,746 | 4/1984 | Maglio | 424/78 |
| 4,666,894 | 5/1987 | Maurer et al. | 514/86 |
| 5,106,649 | 4/1992 | Spicer et al. | 427/4 |
| 5,232,940 | 8/1993 | Hatton et al. | 514/407 |
| 5,571,522 | 11/1996 | Munson et al. | 424/410 |

FOREIGN PATENT DOCUMENTS

| | | |
|---|---|---|
| 1130205 | 8/1982 | Canada . |
| 0527153 | 7/1990 | European Pat. Off. . |
| 0379868 | 8/1990 | European Pat. Off. . |
| 0145846 | 6/1991 | European Pat. Off. . |
| 0595894 | 5/1994 | European Pat. Off. . |
| 2138291 | 10/1984 | United Kingdom . |

OTHER PUBLICATIONS

Hopkins Labels:1979 Diazimon–Captan Seed Protectant, Bean Seed Protectant.

Bakhetla, D. "Studies on the white grub, *Holotrichia consanguinea* (Blanchard) in the Punjab. IV. Control in groundnut through seed treatment with insecticides." (CA 83:27195).

Balasubramanian G, et al. "Seed treatment of sorghum for the control of shootfly *Atherigona soccata* Rondani." (CA 89:68769).

Bonnemaison L. "Protection of the sugar–beet against animal pests by localised soil treatment or seed coating." (CA 76:33165).

Cruger G, et al. "Methods of application for cabbage–fly control and seedling protection with transplanted and diret–sown cabbage." (CA 76:23899).

Durand Y. "Laboratory evalution of the efficiency of seed–covering insecticides used against corn frit fly larvae." (CA 80:91984q).

Ester A, et al, "Filmcoating of cauliflower seed (*Brassica oleracea* L. var. botrytis L.) with insecticides to control the cabbage root fly (*Delia radicum*)" (CA 94:43170).

Ester A, et al. "Filmcoating of cauliflower and Brussels sprouts seeds with insecticides to control the cabbage root fly." (CA 93:92153).

Ester A, et al. "Seed–coating of cauliflower and Brussels sprouts seeds with insecticides against larvae of the cabbage root fly (*Delia radicum*)." (CA 93:80154).

Ferraris, R. "Seed soaking and water injection as carriers of chemicals for sorghum establishment" (CA 93:78102).

Griffiths D, et al. "Trials of organophosphorus and carbamate seed dressings against wheat bulb fly *Leptohlemyia coarctate* in 1966–68." (CA 71:29567s).

Kataria H, et al. "Interactions of fungicide and insecticide combinations against Rhizoctonia damping–off and root rot in canola." (CA 94:51829).

Konradt M, et al. "Komet RP—a new insecticidal seed dressing for sugar and fodder beets." (CA 117:186542r).

Koster P, et al. "Effect of the period between sowing and transplanting on cabbage rootfly (*Delia radicum*) control in brassicas with chlorpyrifos film–coated seeds." (CA 95:86924).

Lawson M, et al. "Polymer formulations of mosquito larvicides. VIII. Laboratory evaluations of selected polyethylene formulations of chlorpyrifos," (CA 80:91987t).

Maines G, et al. "Protection of the first vegetative stages of sugarbeet with the insertion of insecticide in the seed coating." (CA 95:174835).

Marrs G, et al. "Seed treatment with tefluthrin—a novel pyrethroid soil insecticide." (CA 108:217741a).

Melkebeke T, et al. "Sugar beet coating with tefluthrin and its behavior in soil and plants." (CA 114:223497r).

Mishra P, et al. "Control of white grub, *Anomala dimidiata* Hope (Cleoptera: Rutelinae) through insecticidal seed treatment in soybean: a new approach." (CA 95:73778).

Nevill D, et al. "The effect of polymer binder on the activity of insecticides applied to maize seeds," (CA 109:2420e).

Radford B, et al. "Use of insecticides and a press wheel to control soil insects affecting sorghum and sunflower establishment in southern Queensland." (CA 89:67987).

(List continued on next page.)

*Primary Examiner*—Neil S. Levy
*Attorney, Agent, or Firm*—Michael P. Morris; Lynn Marcus-Wyner

[57] ABSTRACT

The present invention relates to an insecticidal coating for a seed comprising one or more binders selected from the group consisting of polymers and copolymers of polyvinyl acetate, methyl cellulose, polyvinyl alcohol, vinylidene chloride, acrylic, cellulose, polyvinylpyrrolidone and polysaccharide and an insecticide wherein the binder forms a matrix for the insecticide; methods for producing said coating and the seed treated with the above described coating.

Additionally the invention concerns a method of controlling soil-borne insect pests, particularly *Diabrotica spp.*, comprising applying to a seed an insecticidal coating as described above.

12 Claims, No Drawings

OTHER PUBLICATIONS

Radin Z. "The possibility of using systemic soil insecticides for the control of the sugarbeet weevil (*Bothynoderes punctiventris* Germ)." (CA 89:15005).

Rajamani S, et al. "Evaluation of insecticides and plant products for the control of insect pests of rainfed upland rice." (CA 107:111057w).

Ram C, et al. "Seed treatment of groundnut for control of white grub, *Holotrichia consanguina* (Blanchard)" (CA 83:26168).

Siminszky B, et al. "Nicosulfuron resistance and metabolism in terbufos—and naphthalic anhydride–treated corn." (CA95:165140).

Vandergeten J, et al. "The influence of insecticides in the pelleting material of seeds on the germination of beet" (CA 90:116982).

Ester, A. et al., Crop Protection, (1994) vol. 13, No. 1, pp. 14–19.

Kosters, P. et al., 1994 BCPC Monograph No. 57: Seed Treatment: Progress and Prospects.

Nevill, D. et al., 1987 BCPC Mono. No. 39 Application to Seeds and Soil.

Siminszky, B. et al., Weed Science, 1995, vol. 43: 163–168.

88–171046/25; 84–147520/24; 91–055543/08; 590170/34.

INSECTICIDAL SEED COATING

BACKGROUND OF THE INVENTION

Numerous technologies are currently utilized to treat seeds with the desired purpose of enhancing crop performance. These treatments include inter alia the coating, pelleting and/or film overcoating of seeds. A range of fungicide treatments as dusts, liquids and slurries have long been used to control soil and seed-borne diseases in vegetable seeds. However, the use of insecticides for vegetable seed treatment has lagged behind that of fungicide seed treatments, and moreover, seed treatment of agronomic crops is even less advanced than that for vegetable seed.

Recent developments in seed treatment technology have focused on the use of techniques to deliver pesticides to seeds. Film-coating has been studied as a means of delivering insecticides such as benfuracarb, chlorpyrifos, chlorfenvinphos and others. In the past, the concentration of these insecticides and other active ingredients present in the seed coating was limited due to direct phytotoxic effect of the insecticide on the seed. Using the instant seed coating of the present invention solves the problem of direct insecticide phytotoxicity to the seed.

SUMMARY OF THE INVENTION

The present invention relates to an insecticidal coating for a seed comprising one or more binders selected from the group consisting of polymers and copolymers of polyvinyl acetate, methyl cellulose, polyvinyl alcohol, vinylidene chloride, acrylic, cellulose, polyvinylpyrrolidone and polysaccharide and an insecticidally effective amount of an insecticide, preferably an organophosphate, phenyl pyrazole or pyrethoid insecticide wherein the binder forms a matrix for the insecticide.

In a preferred embodiment, the invention concerns an insecticidal coating for a corn seed comprising a binder in an amount from about 0.01 to about 15% of the weight of the seed wherein said binder is a vinyl acetate-ethylene copolymer or polymer or copolymer of vinylidene chloride, an insecticide in an amount from about 0.005 to about 50% of the weight of the seed and selected from the group consisting of terbufos, chlorpyrifos, fipronil, tefluthrin, chloroethoxyfos and tebupirimfos wherein said binder forms a matrix for the insecticide.

In another preferred embodiment the invention relates to a method of controlling soil-borne insect pests comprising applying to a seed an insecticidal coating as described above wherein said insecticide is applied to the seed in an insecticidally effective amount to control insect pests.

Additionally the invention concerns a method of preparing a coated seed comprising a) mixing one or more binders with an insecticide selected from the group consisting of terbufos, chlorpyrifos, tefluthrin, fipronil and tebupirimfos wherein the binder serves as a matrix for the insecticide; b) applying the mixture to a seed; c) allowing the mixture to dry on said seed and d) applying a film overcoating to the seed.

In still another embodiment the invention is concerned with a method of protecting emerging seedlings of a crop plant from one or more insect organisms in the seed growing soil environment which comprises applying to the seeds of the crop plant an insecticidally effective amount of an insecticidal coating as described herein above.

The seed growing environment as used herein includes that area directly surrounding the seed and young roots.

Frequently when pesticides are applied to seeds, the pesticide may cause physiological damage to the seed or seedling due to phytotoxic effects of the concentrated pesticide in or around the seed. The present invention is novel in that pesticides may be applied at pesticidally effective concentrations without having an adverse effect on the emerging seedling. The amount of insecticidal pesticides that are needed for control of insect pests is significantly less than has been traditionally used in granular insecticides. In particular it has been found that the use of the coating of the present invention is effective in the control of insect pests, such as Coleoptera and Lepidoptera insects.

It is a most important object of the present invention to provide a seed coated. with a coating which protects the seed or the emerging seedling from physiological damage potentially caused by the insecticidal ingredient of the coating.

A still further object of the invention is to provide a hybrid corn seed coated with an insecticide which aids in the control of Diabrotica insects and particularly corn rootworm larvae.

Another object of the invention is to provide a seed which is coated with an insecticide whereby the use of the insecticide in the coating increases the safety of using said insecticide by reducing operator exposure.

Still another object of the invention is to provide an insecticidal seed coating wherein the insecticide is encapsulated within a matrix that provides for the controlled release of the insecticide over a prolonged period of time.

Yet another aim of the invention is to improve the flowability of seed through a seed planter which will ultimately result in more uniform seed planting.

DETAILED DESCRIPTION OF THE INVENTION

The present invention relates to improved seed coatings which are superior to conventional seed coatings comprising insecticidal components. The invention also relates to the use of insecticides in seed coatings wherein the insecticide has heretofore been ineffective against certain insect pests, however, when formulated in the seed coating of the present invention is effective against those same insect pests.

As used herein the term coated seed means a seed that has been subjected to a procedure whereby the seed is treated with one or more adhering coating layers.

The coating described herein includes two main components: a) one or more binders and b) an insecticide. The binder serves as a matrix for the insecticide.

The binder component of the coating is composed preferably of an adhesive polymer that may be natural or synthetic and is without phytotoxic effect on the seed to be coated. The binder may be selected from polyvinyl acetates, polyvinyl acetate copolymers, polyvinyl alcohols, polyvinyl alcohol copolymers, celluloses, including ethylcelluloses and methylcelluloses, hydroxymethylcelluloses, hydroxypropylcellulose, hydroxymethylpropylcelluloses, polyvinylpyrolidones, dextrins, malto-dextrins, polysaccharides, fats, oils, proteins, gum arabics, shellacs, vinylidene chloride, vinylidene chloride copolymers, calcium lignosulfonates, acrylic copolymers, starches, polyvinylacrylates, zeins, gelatin, carboxymethylcellulose, chitosan, polyethylene oxide, acrylimide polymers and copolymers, polyhydroxyethyl acrylate, methylacrylimide monomers, alginate, ethylcellulose, polychloroprene and syrups or mixtures thereof. Preferred binders include polymers and copolymers of vinyl acetate, methyl cellulose, polyvinyl alcohol, vinylidene chloride, acrylic, cellulose, polyvinylpyrrolidone and polysaccharide. The above-identified polymers include those known in the art and for example some are identified as Rhoplex B-60A, Methocel A 15LV, Methocel E15LV, Cellosize QP, AirFlex 500, Daratak SP 1090, Elvanol 85-30, Rhoplex AC-33-NP, Rhoplex B-85 and Vinamul 18132. Particularly preferred classes of polymers include polymers and copolymers of vinylidene chloride and vinyl acetate-ethylene copolymers.

The amount of binder in the coating will be in the range of about 0.01 to 15% of the weight of the seed. A preferred range will be about 0.1 to 10.0% of the weight of the seed.

The binder must be chosen so that it serves as a matrix for the insectcide. While the binders disclosed above may all be useful as a matrix, the specific binder will depend on the properties of the insecticide. The term "matrix" as used herein means a continuous solid phase of one or more binder compounds and contains vacancies, voids or spaces occupied by the insecticide and filler. The term matrix is given a broad meaning and includes what may be viewed as a matrix system, a reservoir system or a microencapsulated system. In general a matrix system consists of an insecticide and filler uniformly dispersed within a polymer, while a reservoir system consists of a separate insecticide phase, insecticide particles or droplets physically dispersed within a surrounding, rate limiting polymeric phase. Microencapsulation includes the coating of small particles or droplets of liquids. The term microencapsulation has not only been applied to coated particles or droplets but also to dispersions in a solid matrix. Without being limited to the specifc encapsulating system (matrix, reservoir or microencapsulated) the term matrix is meant to be inclusive of the above listed systems.

Suitable insecticides include those selected from pyrethoids, organophosphates, caramoyloximes, pyrazoles, amidines, halogenated hydrocarbons, and carbamates and derivatives thereof. Particularly suitable classes of insecticides include organophosphates, phenylpyrazoles and pyrethoids. Preferred insecticides are those know as terbufos, chlorpyrifos, fipronil, chlorethoxyfos, tefluthrin, carbofuran, imidacloprid, and tebupirimfos. Also included are insect growth regulators for example, methoprene and hydroprene. These are well known to those skilled in the art.

The amount of the insecticide in the coating will vary depending on the type of seed and particular active ingredient, but in general will range from about 0.005 to 50% of the weight of the seed. A preferred percent range for the insecticide is about 0.01 to 40%. A most preferred percentage range is about 0.05 to 20.0%. In particular, the range for chlorpyrifos will be about 0.5 to 20.0%, a preferred range will be about 1.0 to 15%; the range for tefluthrin will be about 0.1 to 10.0%, a preferred range will be about 0.05 to 5.0%; the range for tebupirimfos will be about 0.01 to 5.0%, a preferred range from about 0.05 to 3.0%; and the range for fipronil will be about 0.01 to 10.0%, and a preferred range will be about 0.05 to 5.0%.

As one skilled in the art can appreciate the exact amount will vary depending on the size of the seed to be coated. The insecticide of the coating must not inhibit germination of the seed and should be efficacious during that time in the target insects life cycle which causes injury to a crop plant. One skilled in the art will appreciate that this time will vary depending on the target insect among other factors. In general the coating will be efficacious for approximately 0 to 120 days after sowing. The coating of the present invention will contain an amount of insecticide that is insecticidally effective. An insecticidally effective amount a used herein means that amount of insecticide that will kill insect pests in the larvae or pupal stage of growth or will consisitently reduce or retard the amount of damage produced by insect pests.

Additionally, when the insecticidal component used for the coating is an oily type formulation it will be desirable to hasten the drying process by drying the formulation. This may be accomplished by means well known to those skilled in the art and includes the addition of calcium carbonate, kaolin or bentonite clay, perlite, diatomaceous earth or any adsorbent material added preferrably concurrently with the insecticidal coating layer to absorb the oil or excess moisture. The amount of calcium carbonate or related compounds to dry charge the solution will be in the range of about 0.5 to 10.0% (w/w).

The coatings formed by the invention are capable of effecting a slow rate of release of the insecticide by diffusion or movement through the matrix to the surrounding medium.

Virtually any crop seed can be treated in accordance with the invention, such as cereals, vegetables, ornamentals, and fruits. Particular crop seeds are selected from the group of corn (sweet and field), soybean, wheat, barley, oats, rice, cotton, sunflower, alfalfa, sorghum, rapeseed, sugarbeet, Brassica spp., tomato, bean, carrot, tobacco and flower seed, for example, pansy, impatiens, petunia and geranium. The most preferred seeds include corn and soybean.

Preferred target pest organisms include soil borne insects of the order:

Coleoptera particularly *Diabrotica sp.* (Western, Southern and Northern corn rootworm); *Melanotus sp.* (Corn wireworm); *Phyllophaga sp.* (White grubs, Wireworms, and False wireworms); *Limonius sp.* (Sugarbeet wireworms) and *Agrrotes sp.* (Wheat wireworms, White grubs and Seed maggots):

Lepidoptera particularly *Peridroma sp.* (Varigated cutworm); *Euxoa sp.* (Army cutworm); and *Agrotis sp.* (Black cutworm):

Diptera particularly *Hylemya sp.* (Seedcorn maggot) and *Tetanops sp.* (Sugarbeet root maggot):

Homoptera particularly *Pemphigus sp.* (Sugarbeet root aphid, Cutworm, and White grub) and *Aphis sp.* (Corn root aphid) .

Most preferred target organisms include in addition to *Diabrotica sp, Agrotis ypsilon; melanotus cribulosus; Hylemya cilicrura; Agonoderus lecontei; Feltia subgothica and Phyllophaga rugosa.*

In other embodiments a plasticizer may be used in the insecticidal solution. Plasticizers are typically used to make the film that is formed by the insecticidal coating layer more flexible, improve adhesion, spreadablity and improve the speed during processing. The improved film flexibility is important to minimize chipping, breakage or flaking during handling or sowing processes. Many plasticizers may be used however, most preferred plasticizers include polyethylene glycol, glycerol, butylbenzylphthalate, glycol benzoates and related compounds. The range of the percent of plasticizer in the insecticidal coating layer will be in the range of about 0.1 to about 20 %.

Materials known in the art as fillers may be used in the insecticidal coating. Fiillers include woodflours, clays, activated carbon, sugars, diatomaceous earth, cereal flours, fine-grain inorganic solids, calcium carbonate and the like. Clays and inorganic solids which may be used include calcium bentonite, kaolin, china clay, talc, perlite, mica, vermiculite, silicas, quartz powder, montmorillonite and mixtures thereof. Sugars which may be used include dextrin and maltodextrin. Cereal flours include: wheat flour, oat flour and barley flour. Preferred fillers include perlite, silica and calcium carbonates and mixtures thereof. One skilled in the art will appreciate that this is a non-exhaustive list of materials and that other recognized filler materials may be used depending on the seed to be coated and the insecticide used in the coating.

The filler is chosen so that it will provide a proper microclimate for the seed, for example the filler is used to increase the loading rate of the active ingredient and to adjust the control-release of the active ingredient. A filler aids in the production or process of coating the seed. The effect varies, because in some instances formulated insecticidal compounds will comprise a filler. The amount of filler used may vary, but generally the weight of the filler components will be in the range of about 0.005 to 70% of the seed weight, more preferably about 0.01 to 45% and most preferably about 0.1 to 15%. The filler may be supplied in the coating of the invention with the insecticidal component. The specific examples as described herein utilize readily available commercial formulations of known insecticides wherein filler material is included in the formulation.

In addition to the insecticidal coating layer, the seed may be treated with one or more of the following ingredients: other pesticides including fungicides and herbicides; herbicidal safeners; fertilizers and/or biocontrol agents. These ingredients may be added as a separate layer or alternatively may be added in the insecticidal coating layer.

Suitable pesticides include those listed herein and those listed in The Pesticide Manual, 9th Ed., Editor, Charles Worthing, published by the British Crop Protection Council and hereby incorporated by reference.

A fungicide may be applied to the seed prior to the coating layer described herein. The application of a fungicide as a dust, slurry or the like is a well known practice in the art and is not considered a coating layer within the meaning of the term used herein. Suitable examples of fungicides include Captan (N-(trichloromethyl)thio-4-cyclohexane-1,2-dicarboximide); Thiram (tetramethylthioperoxydicarbonic diamide; Metalaxyl (methyl N-(2,6-dimethylphenyl)-N-(methoxyacetyl)-DL-alaninate; Fludioxonil (4-(2,2-difluoro-1,3-benzodioxol-4-yl)-1 H-pyrrol-3-carbonitrile; and Oxadixyl (N-(2,6-dimethylphenyl)-2-methoxy-N-(2-oxo-3-oxazolidinyl) acetamide. One skilled in the art will be aware of other beneficial fungicides suitable for combating harmful pathogens which are not only a problem for a particular locale where the coated seed is to be grown but also suitable for the protection of seeds in storage before planting.

The amount of fungicide to be added will vary due to the strength of its active ingredient, but in general may range from about 0.001 to about 10% of the weight of the seed and preferably from about 0.01 to 2.0%. However, for a particular situation the amounts may be greater or less.

Suitable herbicides include those selected from carbamates, thiocarbamates, acetam ides, particularly ch loroacetam ides, triazines, dinitroanilines, glycerol ethers, pyridazinones, uracils, phenoxys, ureas, and benzoic acids and derivatives. Suitable safeners include for example, benzoxazine, benzhydryl derivatives, N,N-diallyl dichloroacetamide, various dihaloacyl, oxazolidinyl and thiazolidinyl compounds, ethanone, naphthalic anhydride compounds, and oxime derivatives.

Suitable biocontrol agents are bacteria of the genera Rhizobium, Bacillus, Pseudomonas, and Serratia, fungi of the genera Trichoderma, Glomus, and Gliocladium and mycorrhizal fungi.

The above compounds are listed as examples and are not intended to be an exhaustive list of compounds that can be used in the insecticidal coating layer or in additional other coating layers.

Conventional means of coating may be used for carrying out the coating of the invention. Additionally, various coating machines are available to one skilled in the art. Three well known techniques include the use of drum coaters, fluidized bed techniques and spouted beds. The seeds may be presized prior to coating. After coating the seeds are dried and then optionally sized by transfer to a sizing machine. These machines are known in the art for example, a typical machine used when sizing seed corn in the industry.

Film-forming compositions for enveloping coated seeds are well known in the art, and a film overcoating can be optionally applied to the coated seeds of the present invention. The film overcoat protects the coating layers and optionally allows for easy identification of the treated seeds. In general, additives are dissolved or dispersed in a liquid adhesive, usually a polymer into or with which seeds are dipped or sprayed before drying. Alternatively a powder adhesive can be used. Various materials are suitable for overcoating including but not limited to, methyl cellulose, hydroxypropylmethylcellulose, dextrin, gums, waxes, vegetable or paraffin oils; water soluble or water disperse polysaccharides and their derivatives such as alginates, starch, and cellulose; and synthetic polymers such as polyethylene oxide, polyvinyl alcohol and polyvinylpyrrolidone and their copolymers and related polymers and mixtures of these.

Further materials may be added to the overcoat including optionally plasticizers, colorants, brighteners and surface active agents such as, dispersents, emulsifiers and flow agents including for example, calcium stearate, talc and vermiculite. Additionally pesticides, such as fungicides may be added to the film coat, however, it has been observed that fungicides added initially to the seed gives better results than when added with the overcoat. Fluidized bed and drum film coating techniques described above can be employed for film coating.

The overcoating film is in the range of approximately 0.01% to about 20% of the weight of the seed it is applied to. The preferred range will be about 0.01% to about 10.0% and a most preferred range will be about 0.01 to 5.0%. A preferred solution will vary depending on the specific active ingredient. A preferred overcoating film may include methyl cellulose, hydroxypropylmethylcellulose, polyvinyl acetate, PEG and mixtures thereof. Additionally, depending on the type of insecticide the overcoat film may have incorporated therein a bird repellant compound. These compounds are known in the art and include for example; anthraquinone, methyl anthranilate, capsaicin and oxygenated tetracyclic triterpenoid compounds (also referred to as cucurbitacins) and disclosed in U.S. Pat. No. 5,292,533. Moreover these compounds may be added to the insecticidal coating layer as well.

Depending on the germplasm and crop seed to be coated other benefits may be seen by subjecting the seeds to additional treatments prior to coating such as priming or treatment with growth regulators and biocontrol agents.

In seed priming, the seeds are exposed to enough moisture to enhance germination, but not enough to cause premature germination. Examples of priming procedures are known in the art and include drum priming and steep priming.

Growth regulators which may be added prior to coating includes auxins, cytokinins, gibberellins, ethylene, abscisic acid, IAA, NAA, IBA, ethephon, acetamide, maleic, hydrazide, diminozide and like compounds. Biological treatment may also be used to enhance seed performance and help in the control of harmful organisms.

Seeds treated with the coating of the invention have the following advantages: They posses less risk with respect to operator handling and exposure because of reduced dust exposure. Pesticides can be applied in a uniform way and loss of pesticides during transport and handling is prevented. Phytotoxicity is reduced to the seeds and developing seedlings and therefore there is no adverse effect on germination, seedling emergence and seedling development. Additionally, placement of pesticides, particularly insecticides, closer to the insect soil feeding zone may improve insect control.

Specific embodiments of the invention are described hereinafter by way of example only.

Example 1 - Seeds Treated with an Insecticidal Coating Layer a. Five pounds maize seed pretreated with Captan 400 fungicide and Pro-lzed Red colorant, are coated in an Vector LDCS coating machine. The seeds are warmed for approximately 5 minutes in a rotating pan at approximately 20 r.p.m. with an air flow of 31–32 c.f.m. and an air pressure of 20 p.s.i. A 992 gram insecticide solution comprising 183 grams of 50% chlorpyrifos (the active ingredient in Lorsban 50-SL), 47 gram Airflex 500 (vinyl acetate-ethylene), and 762 grams water is sprayed onto the seed until all the solution is utilized. Inlet air temperature is approximately 50° C. and may be periodically adjusted to maintain seed temperature about equal to or less than 35° C. or germination may be effected.

b. Seed is treated as described above however, a 304.0 gram insecticide solution comprising 101.0 grams of 30% tefluthrin (the active ingredient in Force 30CS), 21.0 grams Vinamul 18132 (vinyl acetate-ethylene) and 182.0 grams water is applied to the seed.

c. Seed is treated as described above however, a 900 gram insecticide solution comprising 15.5 grams of 92% tebupirimphos (the active ingredient in MAT 7484), 90 grams Celite 266, 22.5 gram Airflex 500, and 772 grams water is applied to the seed.

d. Seed is treated as described above however, a 293 gram insecticide solution comprising 11.4 grams of 80% fipronil (the active ingredient in Regent), 22.6 grams Celite 266, 9 grams Airflex 500 and 250 grams water is applied to the seed.

Example 2 - Overcoating of Coated Seeds a. To each of the seed examples described in Example 1 is added a film overcoat. The same machine and set points are used for the overcoat. The machine is set at an inlet temperature of 50° C. which is periodically adjusted to maintain seed temperature about equal to or less than 35° C. A solution comprised of 438 grams water, 2.2 grams Methocel K100M, 0.36 grams PEG 8000, 5.8 grams Pro-lzed red colorant 0.73 grams GP Hytech Calcium stearate 5899 and 2.2.2 grams Afflair is sprayed on the seed for 15 minutes.

Example 3 - Seed Germination and Field Emergence Results

Corn hybrid seed germination is tested under testing rules of Association of Official Seed Analysts (AOSA). In addition, seedling shoots and roots were separated after 7 to 10 days of germination. Dry weight of shoots and roots is recorded to indicate seedling growth. For field emergence test, corn hybrid seed is planted in Iowa, Minnesota, Wisconsin, Nebraska, Illinois, and Ohio in a split plot design with two rows per treatment and four replications. Emergence counts are taken every other day beginning with the first day plants emerge for each treatment and continue until 21 days after emergence. The % emergence is determined for all locations for each treatment and is exhibited in Table 1. This Table demonstrates that seed coating does not adversely affect seedling emergence. The treatments are described as follows:

Treatment 1: Seed is treated as described in Example 1(a);
Treatment 2: Seed is treated as described in Example 1(b);
Treatment 3: Seed is treated as described in Example 1(c);
Treatment 4: Seed is treated as described in Example 1(d);
Treatment 5: Seed is treated with Captan 400 fungicide;
Treatment 6: Seed is treated as described in Example 2;

TABLE 1

| Treatment | % Germination | Shoots(mg) | Roots(mg) | % corn emergence |
|---|---|---|---|---|
| 1 | 99 | 10.2 | 12.55 | 88 |
| 2 | 98 | — | — | 81 |
| 3 | 98 | 13.5 | 11.6 | 87 |
| 4 | 99 | 3.1 | 12.95 | 86 |
| 5 | 99 | — | — | 87 |
| 6 | 99 | 11.67 | 13.14 | 88 |

Lorsban 50-SL; active ingredient is=o,o-dimethyl O-(3, 5,6 trichloro-2-pyridyl) phosphorothioate, Dow Elanco Force 30CS; active ingredient is=[1, 3 (Z)]-(±)-(2,3,5,6-tetrafluoro-4-methylphenyl)methyl3-(2-chloro-3,3,3-trifluoro-1-propenyl)-2,2-dimethylcyclo-propanecarboxylate, Zeneca, Inc.

Mat 7484; active ingredient=o-[2-(1,1-dimethylethly)-5-pyrimidinyl-o-ethyl o-(1-methylethyl) phosphorothioate, Bayer Regent 80WDG; active ingredient=5-amino-1-(2,6-dichloro-4-trifluoromethyl-phenyl)-3-cyano-4-trifluoro methane sulphinyl pyrazole, Rhone-Poulenc Example 4 - Corn Rootworm Efficacy Studies Hybrid corn seeds with and without an insecticidal coating are planted in Nebraska, Iowa, Minnesota, Wisconsin and Illinois to determine the efficacy of various coated seed treatments in standard tests. All seeds contain a Captan pretreatment whether or not a coating is applied. Additionally, an overcoat layer is applied to all coated seed which comprises the coating described in Example 2. Banded granular insecticides are applied at the manufactures label rates using granular insecticide applicators. Plot size for each treatment is two ten foot rows spaced 30 inches apart with four replications of each treatment at each location. Non-diaposing 1st instar Western Corn Rootworm larvae are side dressed on both sides of the corn plants in the row at a rate of 800 eggs per foot of row. Application of the insect larvae is made when the corn seedlings are approximately at the two leaf stage. The placement of the larvae is approximately two inches to the side of the corn plants and two inches below the soil surface. Plots are maintained with normal cultural practices until the corn plants reach the flowering stage. At late brown silk stage, 10 sequential roots from each plot are obtained. The corn stalks are cut at approximately 12 inches above the soil line. Each corn root is washed and after washing the roots are rated on a scale of 1–6 using the Iowa Root Rating Method developed at Iowa State University (Hills and Peters, 1971) and used commonly throughout the corn belt. In the rating, 1=no damage or only a few minor feeding scars; 2=feeding scars evident but no roots eaten off to within 1 ½ inch of the plant; 3=several roots eaten off to within 1½ inch of the plant but never the equivalent of an entire node of roots is destroyed; 4=one root node completely destroyed; 5=two root nodes completely destroyed and 6=three or more root nodes destroyed. A destroyed root is defined as a root that has been pruned to within 1 ½ inch of the base. Pruned roots do not have to originate from a single node, but all pruned roots must equal the equivalent of a full node to count as a destroyed node. The mean root rating results are reported in Table 2 below. In addition, a growth chamber and a greenhouse bioassay was used to determine the effect of insecticidal seed coating on corn rootworm control. For growth chamber assay, corn seed was planted in a 16 oz cup with garden Jiffymix, and allowed to grow for two weeks. Twenty neonate corn rootworm larvae are placed in the Jiffymix near corn roots and allowed to feed for approximately 2 weeks. The larvae are then screened out and the % mortality of the larvae is determined. Each corn root is washed and after washing the roots are rated on a scale of 1–6 using the Iowa Root Rating Method developed at Iowa State University (Hills and Peters, 1971). Some of the results are indicated below in Table 3. The greenhouse assay use 2 gallon pot with 20 mesh corn field soil. Forty corn rootworm larvae are placed in each pot when corn plant was at 4 to 5-leaf stage, and allowed to feed for 2 to 3 weeks. Each corn root is washed and after washing the roots are rated on a scale of 1–6 using the Iowa Root Rating Method developed at Iowa State University (Hills and Peters, 1971). Some of the results are indicated below in Table 3.

TABLE 2

Corn Rootworm Field Efficacy Results

| Treatment | Root rating |
| --- | --- |
| Captan only | 4.7 |
| Overcoating only | 4.5 |
| Example 1(a) | 3.43 |
| Example 1(b) | 3.0 |
| Example 1(c) | 3.2 |
| Example 1(d) | 3.55 |
| Lorsban 15 G soil T-band* | 3.0 |
| Aztec 2.1G soil T-band* | 2.8 |
| Force 1.5G soil T-band* | 2.6 |

*Manufactures label rates and application instructions are followed.

Lorsban 15 G =15% O,O-dimethyl O-(3,5,6 trichloro-2-pyridyl)phosphorothioate, DowElanco Aztec 2.1 G =2% o-[2-(1,1-dimethylethly)-5-pyrimidinyl-o-ethyl o-(1-methylethyl) phosphorothioate and 0.1% cyano(4-fluoro-3-phenoxyphenyl)methyl 3-(2,2-dichloroethyl)-2,2-dimethylcyclopropanecarboxylate, Bayer Force 1.5G =1.5% [1,3 (Z)]-(±)-(2,3,5,6-tetrafluoro-4-methylphenyl)methyl3-(2-chloro-3,3,3-trifluoro-1-propenyl)-2,2-dimethylcyclopropanecarboxylate, Zeneca, Inc.

TABLE 3

Corn Rootworm Bioassay Results

| | Growth Chamber | | Greenhouse |
| --- | --- | --- | --- |
| Treatment | % Mortality | Root Rating | Root Rating |
| Captan only | 27 | 5.57 | 4.02 |
| Example 1(a) | 87 | 3.55 | 3.15 |
| Example 1(c) | 96 | 1.44 | 2.15 |
| Example 1(d) | 80 | 3.75 | — |

What is claimed is:

1. An insecticidal coating for a seed consisting of:
   a. about 0.01 to 15% by weight of one or more binders selected from the group consisting of polymers and copolymers of polyvinyl acetate, methyl cellulose, polyvinyl alcohol, vinylidene chloride, acrylic, cellulose, polyvinylpyrrolidone, and polysaccharide,
   b. about 0.005 to 50% by weight of an insecticidally effective amount of an insecticide selected from the group consisting of terbufos. chlorpyrifos, fipronil, chlorethoxyfos, tefluthrin, carbofuran, imidacloprid, tebupirimfos, methoprene and hydroprene, and
   c. about 0.01% to about 20% of a film overcoat selected from the group consisting of methyl cellulose, hydroxypropylmethylcellulose, dextrin, gums, waxes, vegetable or paraffin oils, water soluble or water dispersible polysaccharides and their derivatives, alginates, starch, cellulose, synthetic polymers, polyethylene oxide, polyvinyl alcohol, polyvinylpyrrolidone, polyvinyl acetate, polyethylene glycol and polymers and copolymers and mixtures thereof,
and optionally water,
wherein the binder forms a matrix for the insecticide on the seed.

2. The coating of claim 1 wherein the seed is selected from the group consisting of soybean, sugarbeet, sunflower, alfalfa, sorghum, rapeseed and tobacco.

3. The coating of claim 1 wherein the binder is a vinyl acetate-ethylene copolymer or polymer or copolymer of vinylidene chloride.

4. Viable seed coated with the coating according to claim 1.

5. An insecticidal coating for a seed consisting of a binder in an amount from about 0.01 to about 15% of the weight of the seed wherein said binder is a vinyl acetate-ethylene copolymer or polymer or copolymer of vinylidene chloride and an insecticidally effective amount of an insecticide selected from the group consisting of imidicloprid, chlorpyrifos, fipronil, tefluthrin and tebupirimfos and in the range from about 0.005 to about 50% of the weight of the seed, and about 0.01% to about 20% of a film overcoat selected from the group consisting of methyl cellulose, hydroxypropylmethylcellulose, polyvinyl acetate and polethylene glycol, wherein said binder forms a matrix for the insecticide on the seed.

6. A method of controlling insect pests from damaging a crop plant comprising applying to a seed an insecticidal coating according to claim 1.

7. A method of controlling insect pests from damaging a crop plant comprising applying to a seed an insecticidal coating according to claim 5.

8. A method of protecting emerging seedlings of a crop plant from one or more insect organisms in the seed growing soil environment which comprises applying to the seeds of the crop plant an insecticidally effective amount of a coating according to claim 1.

9. An insecticidal coating for a seed consisting of
  a. about 0.01 to 15% by weight of one or more binders selected from the group consisting of polymers and copolymers of polyvinyl acetate, methyl cellulose, polyvinyl alcohol, vinylidene chloride, acrylic, cellulose, polyvinylpyrrolidone and polysaccharide,
  b. about 0.005 to 50% by weight of an insecticidally effective amount of an insecticide selected from the group consisting of terbufos, chlorpyrifos, fipronil, chlorethoxyfos, tefluthrin, carbofuran, imidacloprid, tebupirimfos, methoprene and hydroprene, and
  c. about 0.01% to about 20% of a film overcoat selected from the group consisting of methyl cellulose, hydroxypropylmethylcellulose, dextrin, gums, waxes, vegetable or paraffin oils, water soluble or water dispersible polysaccharides and their derivatives, alginates, starch, cellulose, synthetic polymers, polyethylene oxide, polyvinyl alcohol, polyvinylpyrrolidone, polyvinyl acetate, polyethylene glycol and polymers and copolymers and mixtures thereof, and optionally, one or more of water, one or more fungicides or herbicides, or both, a filler selected from the group consisting of woodflours, clays, inorganic solids, activated carbon, diatomaceous earth and calcium carbonate, and mixtures thereof, a plasticizer, a bird repellent compound, a safener, a fertilizer, a biocontrol agent, a colorant, a brightener, a surface active agent ard a seed primer;

wherein the binder forms a matrix for the insecticide on the seed.

10. Seed coated with the coating of claim 9.

11. A method of controlling insect pests from damaging a crop plant comprising applying to a seed an insecticidal coating according to claim 9.

12. A method of protecting emerging seedlings of a crop plant from one or more insects comprising applying to the seeds of the crop plant an insecticidally effective amount of the coating according to claim 9.

* * * * *